(12) United States Patent
Moore

(10) Patent No.: US 7,942,437 B2
(45) Date of Patent: May 17, 2011

(54) DETACHABLE TRAY ACCESSORY FOR STROLLER

(75) Inventor: Lauren A. Moore, San Diego, CA (US)

(73) Assignee: Tray Vous LLC, San Diego, CA (US)

( * ) Notice: Subject to any disclaimer, the term of this patent is extended or adjusted under 35 U.S.C. 154(b) by 363 days.

(21) Appl. No.: 12/284,764

(22) Filed: Sep. 25, 2008

(65) Prior Publication Data

US 2010/0072792 A1  Mar. 25, 2010

(51) Int. Cl.
B62B 1/00 (2006.01)
B62B 7/00 (2006.01)

(52) U.S. Cl. ........................................ 280/642; 280/650

(58) Field of Classification Search ............... 280/642, 280/650, 656, 658, 644, 647, 47.38, 47.18; 108/26, 90; 224/409, 561
See application file for complete search history.

(56) References Cited

U.S. PATENT DOCUMENTS

| | | | |
|---|---|---|---|
| 4,830,243 A * | 5/1989 | Mann | 224/407 |
| 4,856,809 A | 8/1989 | Kohus | |
| 4,989,891 A | 2/1991 | Huang | |
| 5,382,074 A | 1/1995 | Pietra | |
| 5,437,493 A | 8/1995 | Weisleder | |
| 5,816,648 A | 10/1998 | Baccili et al. | |
| 5,855,384 A * | 1/1999 | Pike et al. | 280/47.38 |
| 5,964,501 A * | 10/1999 | Magnani | 297/174 R |
| 6,331,032 B1 | 12/2001 | Haut et al. | |
| 6,368,006 B1 | 4/2002 | Yang et al. | |
| 6,447,001 B1 | 9/2002 | Hsia | |
| 6,513,827 B1 | 2/2003 | Barenbrug | |
| 6,698,773 B2 | 3/2004 | Hsia | |
| 7,273,224 B2 | 9/2007 | Wang | |
| 7,281,732 B2 | 10/2007 | Fox et al. | |
| 7,413,213 B2 * | 8/2008 | Pike et al. | 280/642 |
| 7,694,995 B2 * | 4/2010 | Dotsey et al. | 280/642 |
| 7,717,456 B2 * | 5/2010 | Chen et al. | 280/642 |
| 2005/0242549 A1 | 11/2005 | Longenecker et al. | |
| 2009/0127828 A1 * | 5/2009 | Longenecker et al. | 280/650 |

OTHER PUBLICATIONS

Baby Jogger Accessory web page showing City Micro-Child Tray, Date of Publication Unknown.

* cited by examiner

*Primary Examiner* — Hau V Phan

(74) *Attorney, Agent, or Firm* — Clause Eight IPS; Michael Catania

(57) ABSTRACT

A detachable tray accessory for a stroller secured by a left and right side member or lock housing member each containing a detachable attaching means that attaches to and releases from a corresponding lock receiver on the stroller assembly or stroller seat. The detachable tray accessory for a stroller includes a support bar for supporting the shape and weight of a flat surface tray removably attachable to the support bar.

8 Claims, 3 Drawing Sheets

DETACHABLE TRAY ACCESSORY FOR STROLLER

CROSS REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates generally to a stroller tray, and particularly to a detachable tray accessory for a stroller seat secured by a left and right lock housing member with a lock button that inserts into and releases from an existing corresponding lock receiver on the stroller.

2. Description of the Related Art

It can be appreciated that strollers having stroller trays have been in use for years. Typically, strollers with trays include trays that are permanently attached to the stroller. There are also many conventional strollers that do not provide a tray accessory at all. The main problem with conventional strollers without a tray accessory is that they do not provide for the convenience of feeding surface or play for the child. A problem with permanently attached stroller trays is that they do not allow for the removal of the tray, enabling a child's enhanced mobility or use of another accessory, such as a handle, in place of the tray.

While there has been a trend to provide versatile strollers with accessories for the child and the child's caretaker, further improvements in the effectiveness and interchangeability of the accessories are desirable, and the truss detachable tray accessory for stroller of the present invention addresses the existing problems and provides related solutions and benefits.

BRIEF SUMMARY OF THE INVENTION

The present invention provides a new detachable tray accessory for a stroller, which is secured by a left and a right detachable means that insert removably attach and releases from a corresponding lock receiver located on the stroller assembly, including stroller frame and/or stroller support members, or stroller seat.

The present invention recognizes that providing a detachable tray accessory for a stroller which can be built in different configurations and able to be used with a various strollers can enhance the comfort of the child riding in the stroller, provide a surface for feeding and play, and make removal of the tray to be exchanged with other accessories easier for the caretaker of the child. The present invention can be built and/or adapted to be used in connection with any stroller that include detachable receiving means for accessories such as a stroller handle or guard or a stroller seat guard or handle. The present invention is particularly adaptable to be used in connection with strollers manufactured by Royalty Bugaboo, S.A.R.L (Luxembourg), including the Chameleon or the Frog models.

One aspect of the present invention includes a detachable tray accessory for a stroller, including a substantially crescent-shaped support bar including detachable means, the support bar being removably attachable to a stroller seat having means for receiving accessories; and a substantially flat tray attached to the support bar.

Another aspect of the present invention includes a tray accessory for a stroller, including a substantially crescent-shaped support bar including a left and a right side members which angle downward from the plane of the crescent-shaped support bar, the left and the right side members each including a spring loaded detachable lock button for removably attaching the support bar to a stroller seat having means for receiving accessories having means for receiving accessories, the left and the right side members having a length that provides for sufficient space between a child seated in the stroller seat and the support bar; and a substantially flat tray including raised rounded edges, the tray being removably attached to the support bar by way of the raised rounded edges.

BRIEF DESCRIPTION OF THE SEVERAL VIEWS OF THE DRAWINGS

Various other objects, features and attendant advantages of the present invention will become fully appreciated as the same becomes better understood when considered in conjunction with the accompanying drawings, in which like reference characters designate the same or similar parts throughout the several views.

DETAILED DESCRIPTION OF THE INVENTION

Figure 1:
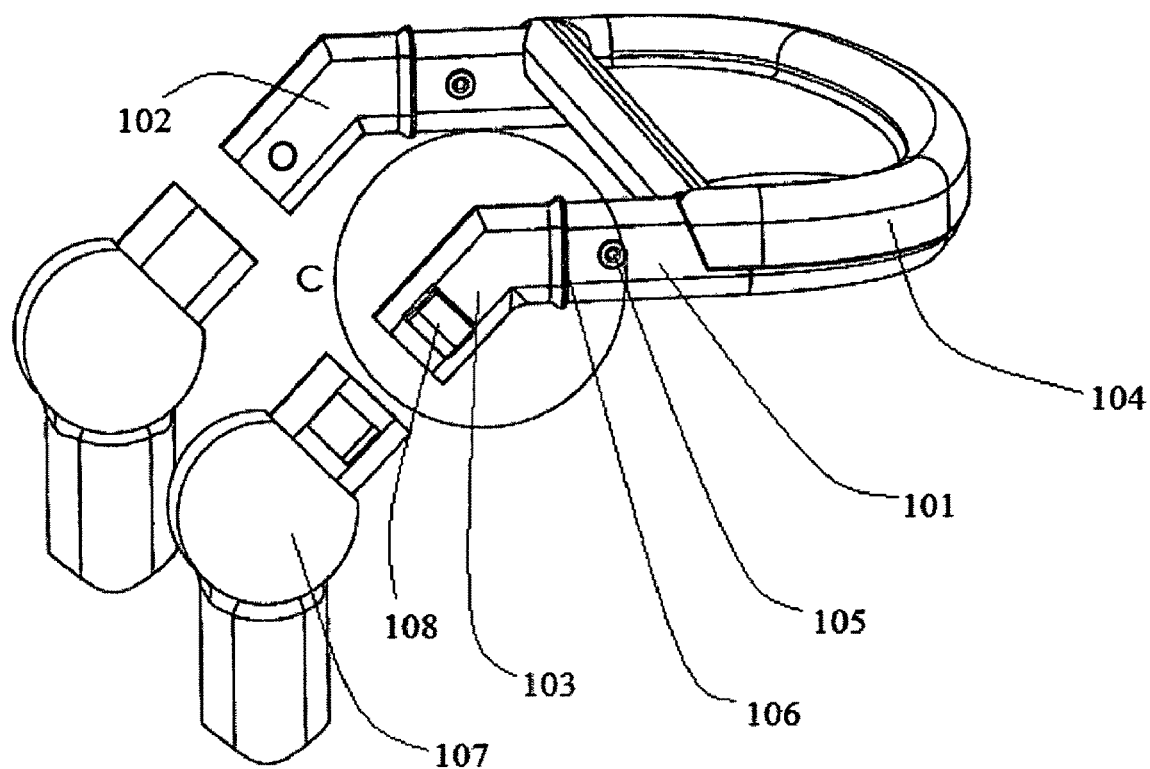
FIG. 1 shows a perspective view of an embodiment of the detachable tray accessory with angled lock housing.
Figure 2:
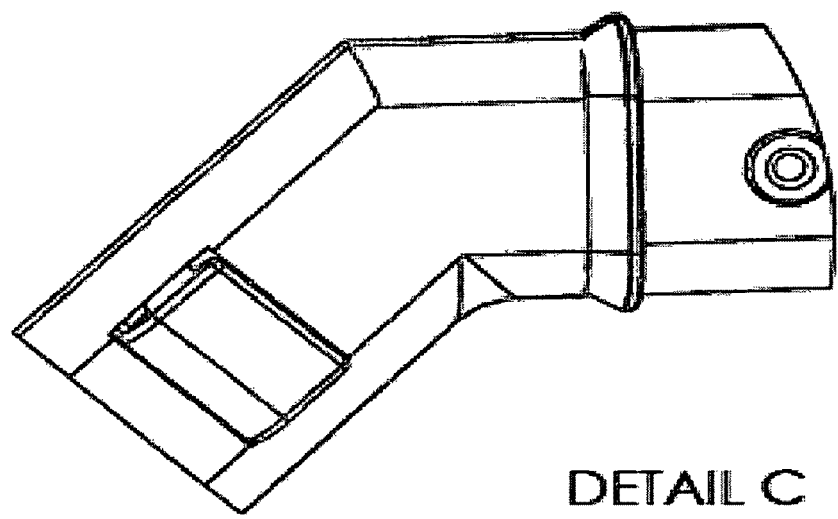
FIG. 2 shows a perspective view of an embodiment of the lock housing.
Figure 3:
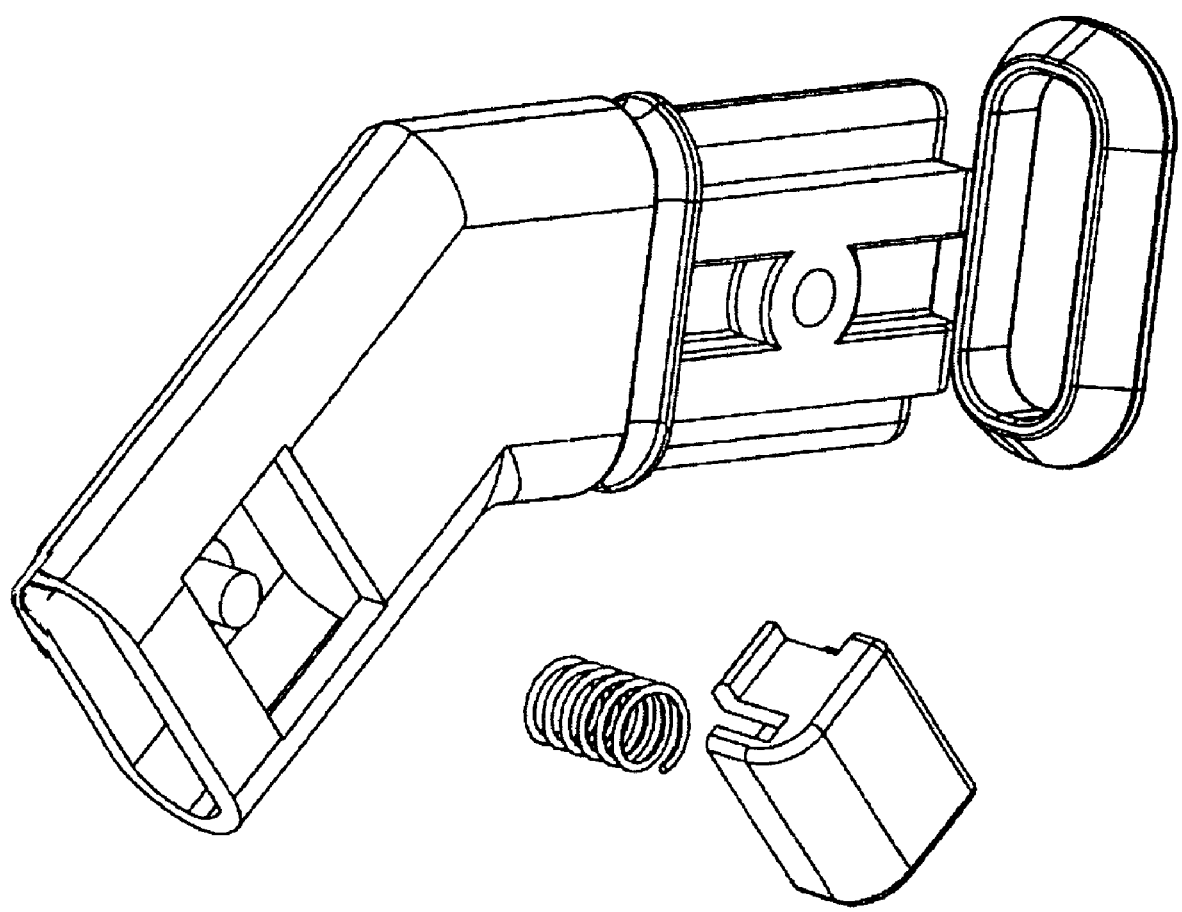
FIG. 3 shows an exploded view of an embodiment of the lock housing.
Figure 4:
FIG. 4 shows a perspective view of an embodiment of the detachable tray with angled side members.
Figure 5:
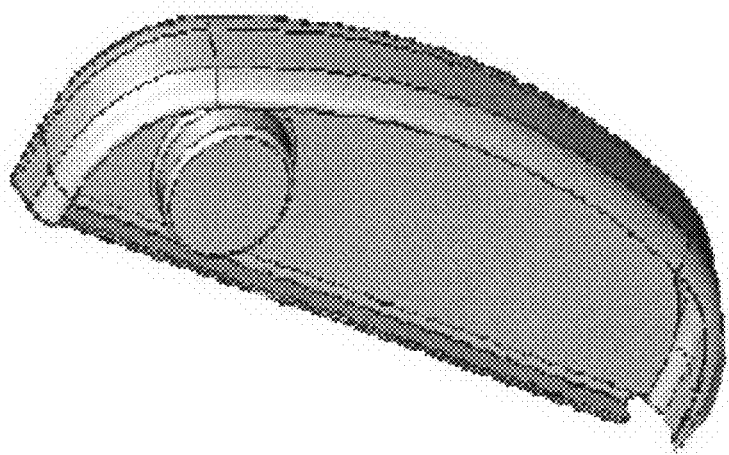
FIG. 5 shows a perspective view of an embodiment of the tray with a sunken receptacle.

Further objectives and advantages of the present invention will become apparent as the description proceeds and when taken in conjunction with the accompanying drawings. To gain a full appreciation of the scope of the present invention, it will be further recognized that various aspects of the present invention can be combined to make desirable embodiments of the invention. Unless defined otherwise, all technical and scientific terms used herein have the same meaning as commonly understood by one of ordinary skill in the art to which this invention belongs. Where a term is provided in the singular, the inventor also contemplates the plural of that term. The nomenclature used herein and the procedures described below are those well known and commonly employed in the art.

One embodiment of the present invention includes a tray accessory for a stroller which has existing receiving means, such as lock receiver for an accessory, such as a stroller seat handle. The tray accessory of the present invention includes a substantially crescent-shaped support bar. The substantially crescent shaped-support bar is not limited to any particular shape, and it does not have to be crescent in configuration, and may include other shapes such as part of an oval, triangle, square, rectangle, trapezoid, polygons, and other geometric shapes, but what is important is that the support bar extend away from the stroller seat and be able to provide for sufficient and comfortable space between the seated child and the support bar, especially when the support bar and the removable tray are attached to one another. Preferably, the support bar should provide for a space of between about 3 to about 10 inches, and more preferably between about 5 to about 6 inches from the seated child.

The support bar of the present invention may also include a left and a right side member that are connected at one end to the support bar and are angle downward from the plane of the crescent-shaped support bar toward the other opposing end, which attaches to the stroller body or stroller seat depending on the stroller's configuration. This, downward angle of the side members allow for the tray to be held in substantially flat position in front of the child, when the stroller seat is set up at the seating position. Preferably, the left and right side members are angled downward by between about 20 to 60 degrees, and more preferably about 45 degrees from the plane of the substantially crescent-shape support member. The support bar and side member of the present invention can be made of any rigid, flexible, or semi-flexible material that is suitable for this purpose and can bear the weight of the child's food, drink, toys, and the like. The material can include metals, preferably light-weight metals, plastic, wood, or a combination thereof. The support bar and side members may be unitary or integral and made of one piece of material, or the support bar and the side members may be separate and fixedly attached to each other by any suitable attaching means, such as rivets, screws, nuts and bolt, or the like.

The support bar of the present invention further includes a detachable means at each ends of the support bar, making the support bar removably attachable to a stroller assembly or a stroller seat having means for receiving accessories. Preferably the detachable means are located at the end of the left and the right side members of the present invention. The detachable means may be any means suitable for the purpose of allowing a member to be attached to another member and similarly released, such as quick release and lock mechanisms, snap lock mechanisms, push spring loaded lock buttons, and the like. Preferably, the detachable means include a spring loaded detachable lock button for removably attaching the support bar to a stroller seat having means for receiving accessories. More preferably, the detachable means are included in a lock housing, preferably made of rigid plastic. In some embodiments of the present invention, the side members may not be angled, but they are attached to the lock housing, which provides for the angled configuration, and the side members and the attached lock housing together comprise the side members that are angled downward. Thus, when it is stated that a side member is angled downward, as used throughout this application and the claims, it is included in the definition that a side member is itself angled downwards, or alternatively a side member that is not itself angled downward, but is attached to another member, such as the lock housing which is angled downwards, or a combination of the two. In one embodiment, the side members attach to the lock housing at one end, and the lock housing provides for the angled configuration in its structure, and includes the detachable locking mechanism at the other opposing end. The lock housing may be attached to the side members by any attaching means, preferably a fixedly attaching means, such as rivets, screws, nuts and bolts, or adhesives. Also, the lock housing may further include a raised seal for receiving the side members, preferably made of rubber or other soft material that would not cause discomfort or injuries to the child is the child hands or arms rubs against the seal.

The present invention also includes a substantially flat tray with a central flat area. The tray can be made from any rigid, flexible, or semi-flexible material that is suited for the purpose of a tray, such as light-weight metal, plastic, wood, or a combination thereof. Preferably the tray is made of machine washable plastic. The tray of the present invention may include raised rounded edges, making the tray removably attachable to the support bar by way of the raised rounded edges. The raised round edges preferably have a configuration that is smaller than the support bar, such that the raised round edges of the tray can removably snap onto the support bar and stay in place by the tension provided by the raised round edges gripping the support bar in place. Moreover, the tray of the present invention may also include one or more sunken receptacles for holding a child's items, such as drink holder, plate holder, and toy holder.

All headings are for the convenience of the reader and should not be used to limit the meaning of the text that follows the heading, unless so specified. Various changes and departures may be made to the present invention without departing from the spirit and scope thereof. Accordingly, it is not intended that the invention be limited to that specifically described in the specification or as illustrated in the drawings, but only as set forth in the claims. Although the invention has been described and illustrated with respect to exemplary embodiments thereof, it should be understood by those skilled in the art that the foregoing and various other changes, omissions, and additions may be made therein and thereto, without parting from the spirit and scope of the present invention.

Referring to FIG. 1, this example provides an embodiment of a tray accessory for a stroller including a substantially crescent-shaped support bar 101 including a left and a right side members 102 and 103 which angle downward from the plane of the crescent-shaped support bar 101, the left and the right side members 102 and 103 each including a spring loaded detachable lock button 108 for removably attaching the support bar 101 to a stroller seat 107 having means for receiving accessories, the left and the right side members 102 and 103 having a length that provides for sufficient space between a child seated in the stroller seat and the support bar 101. This example of the present invention also includes a substantially flat tray 104 including raised rounded edges, the tray 104 being removably attached to the support bar 101 by way of the raised rounded edges.

In this example of the present invention, the left and the right side members 102 and 103, each further include a lock housing 102 and 103 for the spring loaded detachable lock buttons 108. It should be appreciated that in some embodiments, the side member themselves may be angled downward from the plane of the support bar 101, and in other embodiments the side members are not angled, but are attached to the lock housings 102 and 103 by way of a rivet 105, and the lock housings 102 and 103 provide for the angled configuration in their structure such that it is shown in FIG. 1. Furthermore, the lock housings 102 and 103 further include a raised seal 106 for receiving the left and the right side members.

What is claimed is:

1. A detachable tray accessory for a stroller, comprising:
   a support bar comprising
      an elongated cross bar comprising a front side and an opposing back side, a first end, and an opposing second end,
      a rounded extension bar having a first end and a second end, the first end of the rounded extension bar being fixedly attached to the front side and the first end of the cross bar, and the second end of the rounded extension bar being fixedly attached to the front side and the second end of the cross bar, such that the rounded extension bar extends outwardly and away from the cross bar, a left side member fixedly attached at one end to the back side and the first end of the cross bar at a downward angle from the plane of the support bar and comprising a first detachable means for removable attachment to the stroller having means for receiving accessories,
a right side member fixedly attached at one end to the back side and the second end of the cross bar at a downward angle from the plane of the support bar and comprising a second detachable means for removable attachment to the stroller having means for receiving accessories; and
a substantially flat tray comprising
a curved peripheral raised rounded edge region for covering and attachment to the rounded extension bar of the support bar, and
a straight peripheral raised rounded edge region for covering and attachment to the cross bar of the support bar.

2. The detachable tray accessory of claim 1, wherein the support bar comprises a substantially crescent-shaped configuration.

3. The detachable tray accessory of claim 2, wherein the left and the right side members comprise a length that provides for sufficient space between a child seated in a stroller seat and the support bar.

4. The detachable tray accessory of claim 2, wherein the left and the right side members angle downward from the plane of the crescent-shaped support bar by 45 degrees.

5. The detachable tray accessory of claim 1, wherein the left and the right side members each comprise a spring loaded detachable lock button for removably attaching the support bar to a stroller seat.

6. The detachable tray accessory of claim 5, wherein the left and the right side members each further comprise a lock housing for the spring loaded lock buttons.

7. The detachable tray accessory of claim 6, wherein the lock housing further comprises a raised seal for receiving the left and the right side members.

8. The detachable tray of claim 1, wherein the substantially flat tray further comprises one or more sunken receptacles for holding a child's items.

\* \* \* \* \*